US007974627B2

(12) United States Patent
Mia et al.

(10) Patent No.: US 7,974,627 B2
(45) Date of Patent: Jul. 5, 2011

(54) USE OF RADIO ACCESS TECHNOLOGY DIVERSITY FOR LOCATION

(75) Inventors: Rashidus S. Mia, Phoenixville, PA (US); Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 430 days.

(21) Appl. No.: 12/268,719

(22) Filed: Nov. 11, 2008

(65) Prior Publication Data

US 2010/0120435 A1    May 13, 2010

(51) Int. Cl.
*H04W 36/00* (2009.01)
(52) U.S. Cl. ..... 455/440; 455/436; 455/442; 455/432.1; 455/435.1; 455/456.1; 455/404.2; 370/331
(58) Field of Classification Search .................. 455/440, 455/436, 442, 432.1, 435.1, 456.1, 404.2; 370/331
See application file for complete search history.

(56) References Cited

U.S. PATENT DOCUMENTS

| | | | |
|---|---|---|---|
| 5,327,144 A | 7/1994 | Stilp et al. | |
| 5,608,410 A | 3/1997 | Stilp et al. | |
| 6,097,336 A | 8/2000 | Stilp | |
| 6,115,599 A | 9/2000 | Stilp | |
| 6,119,000 A | 9/2000 | Stephenson et al. | |
| 6,463,290 B1 | 10/2002 | Stilp et al. | |
| 6,503,428 B1 | 1/2003 | Parker | |
| 6,519,465 B2 | 2/2003 | Stilp et al. | |
| 6,782,264 B2 | 8/2004 | Anderson | |
| 6,873,290 B2 | 3/2005 | Anderson et al. | |
| 7,023,383 B2 | 4/2006 | Stilp et al. | |
| 7,149,524 B2 | 12/2006 | Reynolds | |
| 2005/0255855 A1 | 11/2005 | Spirito et al. | |
| 2006/0003775 A1 | 1/2006 | Bull | |
| 2007/0291714 A1* | 12/2007 | Laroia et al. | 370/338 |

OTHER PUBLICATIONS

PCT Notification of Transmittal of the International Search Report and the Written Opinion of the International Searching Authority mailed Dec. 23, 2009, issued in corresponding International Application No. PCT/US09/62629.

* cited by examiner

*Primary Examiner* — Nghi H Ly
(74) *Attorney, Agent, or Firm* — Woodcock Washburn LLP

(57) ABSTRACT

Various aspects are disclosed herein for determining a location estimate for multi-mode mobile devices using measurements from one or more radio access technologies and providing a combined location solution. Using the multiple radio access technology capability of the wireless communications system, a mobile communications device may be located on a first radio network characterized by a first radio modulation technique, radio network topology, and channel bandwidth. The mobile communications device may then be handed off to a second radio network and located using a second radio network characterized by a second radio modulation technique, radio network topology, and channel bandwidth. The two location estimates may then be used to develop a combined location estimate.

117 Claims, 8 Drawing Sheets

USE OF RADIO ACCESS TECHNOLOGY DIVERSITY FOR LOCATION

TECHNICAL FIELD

The subject matter described herein relates generally to methods and systems for locating wireless devices using cellular radio networks and other types of voice or data wireless communications systems. More particularly, but not exclusively, the subject matter described herein relates to the use of multiple location estimations using successive or multiple radio air interfaces to locate a wireless device using network-based location techniques.

BACKGROUND

Early work relating to network-based wireless location systems is described in commonly assigned U.S. Pat. No. 5,327,144 "Cellular Telephone Location System," which discloses a system for locating cellular telephones using time difference of arrival (TDOA) techniques. Further enhancements of the system disclosed in the '144 patent are disclosed in commonly assigned U.S. Pat. No. 5,608,410 "System for Locating a Source of Bursty Transmissions."

Modification of mobile transmissions to improve the location capability of a network-based wireless location system was previously disclosed in commonly assigned U.S. patents:

- U.S. Pat. No. 6,097,336; "Method for Improving the Accuracy of a Wireless Location System"
- U.S. Pat. No. 6,115,599; "Directed Retry Method for use in a Wireless Location System"
- U.S. Pat. No. 6,463,290; "Mobile-assisted network-based techniques for improving accuracy of wireless location system"
- U.S. Pat. No. 6,519,465; "Modified Transmission Method for Improving Accuracy for E-911 Calls"

Use of parallel or successive location estimates to fulfill the expected or demanded location quality of service has been previously disclosed in the following commonly assigned US patents:

- U.S. Pat. No. 6,503,428; "Multiple Pass Location Processing"
- U.S. Pat. No. 6,873,290; "Multiple Pass Location Processor"
- U.S. Pat. No. 7,023,383; "Multiple Pass Location Processor"

Third generation mobile services such as Universal Mobile Telecommunications System (UMTS), a wide-band code division multiple access (CDMA) modulated air interface, are being deployed in many areas of the world. Until deployment is more widespread, coverage may not be complete and thus in some coverage areas third generation services may not be available or a mix of third generation and legacy services may be provided. For example, one coverage area may only provide Global System for Mobile communications (GSM) services, while an adjacent coverage area may provide mixed UMTS/GPS services. A mobile terminal equipped with both UMTS and GSM technology may thus provide a mobile user with seamless mobile service when traveling between coverage areas. Such dual-mode mobile terminals may require a handoff mechanism between the UMTS and GSM technologies. For example, if the user has established a voice call using UMTS technology, and then moves outside of UMTS coverage, it is desirable that the voice call be handed over to the GSM network without perceived interruptions. Such a handover mechanism is provided by the Inter-Radio Access Technologies (Inter-RAT) handover technique. The Inter-RAT capability in the context of dual mode UMTS and GSM mobile devices is supported by 3rd Generation Partnership Project (3GPP) standards.

Diversity of radio access technologies (e.g., AMPS, TDMA, GSM, iDEN, CDMA, W-CDMA, and OFDM) may provide certain advantages and disadvantages in locating mobile devices. For example, the diverse characteristics provided by a second radio network type, such as antenna placement or downtilt, may provide a more accurate network-based location determination. A second radio network type may also mitigate problems encountered using a first radio network. Using multiple radio networks for network-based location may also take advantage of the differing topology of the radio networks. For example, one network may have larger or smaller cell-site spacing then the other network. In some cases, the second radio network may provide a better geometric dilution of precision (G-DOP) than the first. Additionally, a combination of both networks may provide a better G-DOP than either network alone.

Previous location determination systems, such as the TruePosition Location Platform (also known as the Wireless Location System (WLS)) supported location determination using the Inter-RAT handover technique using the capability of dual mode UMTS and GSM mobile devices and the Inter-RAT feature. Location determination using mixed UMTS-GSM networks have been used to provide low-rate location services (such as emergency services, e.g. 9-1-1, 1-1-2, and 9-9-9 services) for both idle mode and mid-call scenarios without the need to install more advanced dual-mode GSM and UMTS Location Measurement Unit (LMU) networks.

Deployment of the Inter-RAT handover technique typically requires that the wireless operator's UMTS Radio Access Network (RAN) vendor support a Inter-RAT handover feature in its Mobile Switching Center (MSC) software. This handover capability may be used to support location determination for UMTS mobile stations in dual mode UMTS/GSM networks using time difference of arrival (TDOA) or TDOA and angle of arrival (AoA) location techniques based on LMUs installed for AMPS, TDMA and GSM locating. For example, dual mode GSM and UMTS air interface support is typically available for new UMTS mobile devices due to the limited deployment of UMTS networks as discussed above. Some carriers also deploy mobile devices that support UMTS (or other 3G technologies) and GSM for international roaming.

However, the existing multi-mode systems (such as the UMTS/GSM dual mode scenario with handover capability) do not utilize radio technology diversity for location determination. In the UMTS/GSM example, the handover mechanism may be used to direct the mobile device to use a second radio technology when a first technology is not available. However, existing systems do not support location determination using, for example, a first location using UMTS followed by a second location using GSM. It would also be advantageous to first perform an analysis of the first location determination to determined if a second location determination may improve upon the results of the first location determination. Furthermore, it would be advantageous to utilize both the control channel and traffic channel to provide further diversity opportunities. There is a thus need to enable greater use of the multi-mode mobile device capabilities and the Inter-RAT functionality of current and developing wireless communications networks to provide improved location estimation capabilities.

SUMMARY

Various methods and systems are disclosed herein for determining a location estimate for a multi-mode mobile device using measurements from one or more radio access technologies and providing a combined location solution. Using the Inter-RAT capability of the wireless communications system, a multi-mode mobile communications device may transmit signals on a first radio network comprised of at least one sensor station. The mobile communications device may optionally be located on the first radio network using the transmitted signals. Each sensor station may further comprise, for example, an LMU and an antenna, power and other backhaul equipment associated with a base station. Each sensor station may further be characterized by a first radio modulation technique, radio network topology, and channel bandwidth for communicating with the mobile communications device. The mobile communications device may then be handed off to a second radio network comprised of at least one sensor station. Each sensor station of the second network may further comprise, for example, an LMU and an antenna, power and other backhaul equipment associated with a base station, and further characterized by a second radio modulation technique, radio network topology, and channel bandwidth. The multi-mode mobile communications device may transmit signals on the second radio network. The mobile communications device may optionally be located on the second radio network using the transmitted signals. The first and second transmitted signals and/or first and second locations may then be used to develop a combined location estimate. In one embodiment the first radio network may first be analyzed to determine if a second location radio network is desired. In some embodiments the second network may be identical to the first network or share common network resources. In other embodiments the second network may differ with respect to modulation, topology, bandwidth, and other factors related to location estimation.

In one embodiment, mobile wireless devices may be commanded to establish channels on two or more radio access technologies (either in parallel or in series). Measurements may then be made on each channel and used to compute a single location estimate. This functionality can be directed based on the network-based wireless location technology available in each radio network. For example, a multi-mode wireless device using a large GSM macro-cell may be handed off to a smaller UMTS-based Pico-cell, which may then use a cell-ID, cell-ID with time or power based ranging, power difference of arrival, or mobile-based (downlink) location estimation techniques such as O-TDOA, ECID, or AFLT. In a further embodiment, first and second location determinations may be performed using the control channel, followed by first and second location determinations using the traffic channel.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

It should be noted that this summary is provided to introduce a selection of concepts in a simplified form that are further described below. This summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description, is better understood when read in conjunction with the appended drawings. In order to illustrate the present disclosure, various aspects of the disclosure are illustrated. However, the disclosure is not limited to the specific aspects shown. The following figures are included.

DETAILED DESCRIPTION OF ILLUSTRATIVE EMBODIMENTS

Figure 1:
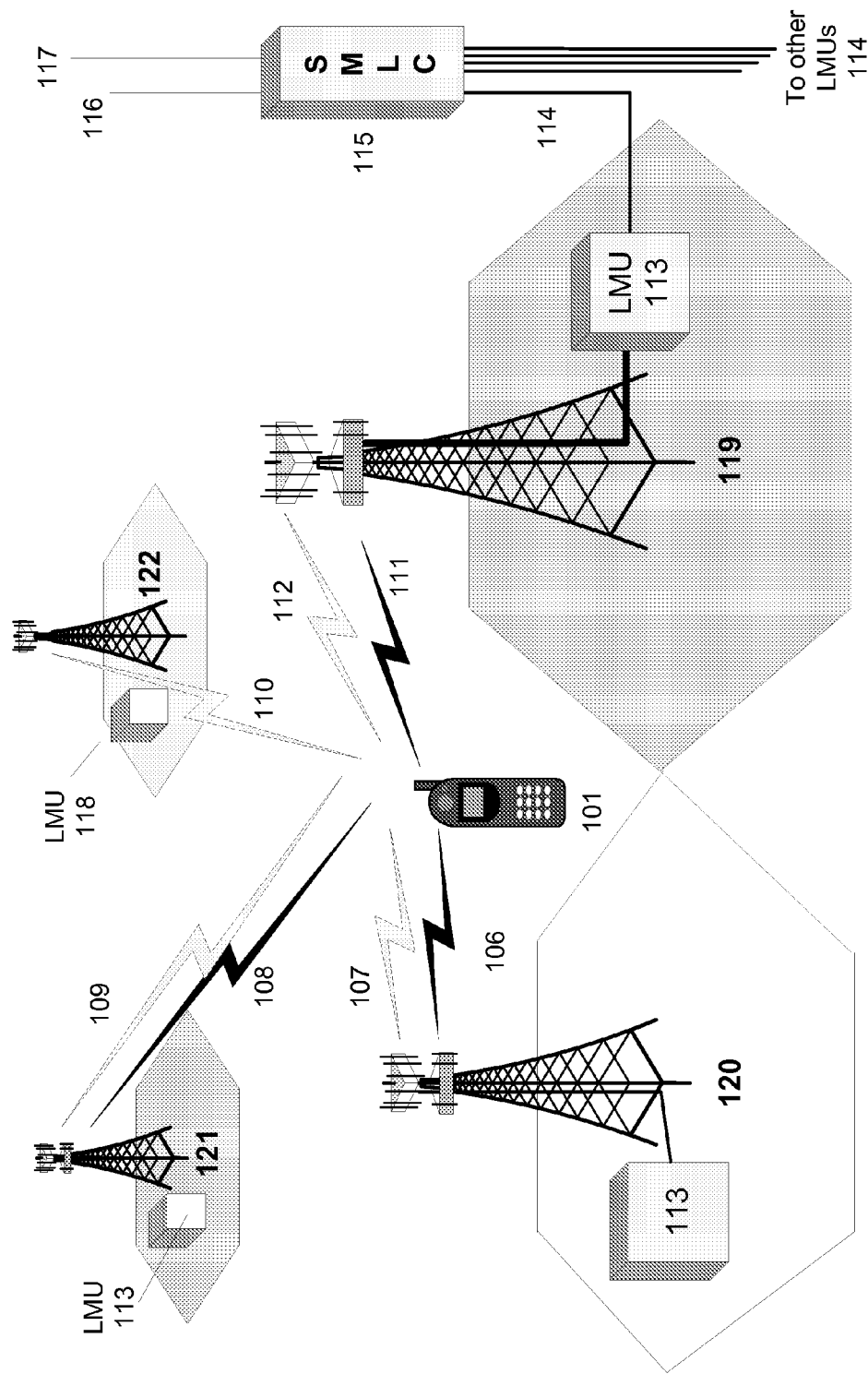
FIG. 1 graphically depicts a representative dual mode GSM and UMTS wireless communication network.

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Various radio access technologies (e.g., AMPS, TDMA, GSM, iDEN, CDMA, W-CDMA, and OFDM) typically co-exist in the same geographical area or service area. Such areas are normally created by governmental regulation and multiple bands (e.g., cellular, PCS, DCS, AWS, etc.) may be allocated to multiple wireless carriers.

A wireless carrier may operate multiple radio air interfaces within the same geographical area to support legacy and roaming subscribers. Often these multiple air interfaces are operated in separate frequency bands. Furthermore, subscribers are increasingly using multi-band, multi-mode wireless voice and data capable devices for their communications needs.

A network-based wireless location system deployed in a geographic service area can provide location capability to all handsets in a wireless communications network or multiple communication networks using specialized receivers called LMUs that may be geographically distributed over the area. The TruePosition Location Platform, for example, provides high-rate, low-latency cell-ID, TDOA, AoA, and hybrid TDOA/A-GPS location capability using wideband, multi-mode receivers. The multi-mode LMU network wideband software-defined-radio (SDR) receivers are capable of multiple, simultaneous TDD or FDD signal reception and location estimation across the U.S. and international licensed wireless bands of 700/800/900,1500/1700/1800/1900, 2100/2300/2600/3500 Megahertz as well as unlicensed bands from 500 MHz to 3500 MHz.

Deployment of the Inter-RAT location technique may incorporate multi-mode wireless devices, the multi-mode LMU and a wireless network operator infrastructure that supports Inter-RAT handover in its mobility management software. This handover capability is typically supported by many MSC vendors and used to support location determination for UMTS mobile stations in dual mode UMTS/GSM networks using TDOA or TDOA and AoA location techniques based on legacy LMUs already installed for AMPS, TDMA and GSM location determination.

Each Radio Air Interface Technology exhibits various characteristics with respect to locating mobile devices. For example, spread spectrum signals such as those used with CDMA (IS-95, IS-2000 and UMTS wireless networks) can produce very accurate TDOA and AoA estimates due to their wider bandwidths, but suffer from near-far problems due to a tight closed loop power control. Conversely, GSM waveforms are less susceptible to near-far problems, but typically have larger TDOA and AoA estimation errors due to un-resolvable multi-path components. Similar measurement diversity also exists in downlink (mobile generated) measurements.

TDOA is based on measuring the difference in the signal's propagation time between pairs of geographically distributed receiver sites and determining the location via correlation processing. Wireless communications networks are naturally suited for application of TDOA/FDOA technology because many cell sites are distributed over a geographic area providing a region of coverage. Furthermore, wireless providers distribute their channels over many frequencies to minimize interference between sites. Thus, although only a single site handles the call at any one time, the number of sites that actually receive the wireless phone's transmission is large because of the frequency reuse patterns. TDOA technology typically requires reception of the signal to be located at multiple sites. Additionally, the receivers at these receiving sites must typically be accurately time-synchronized because radio waves propagate at the speed of light (approximately one foot per nanosecond). The difference in propagation time between two sites can be measured by correlating the signal received at site A with the signal received at site B. The correlation function, $A(\tau, f)$, can be expressed as:

$$A(\tau, f) = \int_0^T s_A(t) s_B^*(t+\tau) e^{-j2\pi ft} dt.$$

The mobile device's signal is measured at the two time-synchronized sites over time duration T and the delay ($\tau$) and Doppler frequency (f), varied to maximize $A(\tau,f)$. Once $\tau_{max}$ is determined the source of transmission is known to lie on a hyperbola with the two receive sites at the foci of the hyperbola. To resolve the ambiguity, the signals received at other sites are also correlated to yield other hyperbolas. The intersection of these multiple, distinct hyperbolas may determine a unique location.

Theoretically, the accuracy of the TDOA estimation is limited by several practical factors such as integration time, signal-to-noise ratio (SNR) at each receive site, as well as the bandwidth of the transmitted signal. The Cramer-Rao bound (CRLB) illustrates this dependence, and can be approximated as:

$$TDOA_{rms} = \frac{1}{2\pi f_{rms} \sqrt{2SbT}}.$$

Where $f_{rms}$ is the RMS bandwidth of the signal, b is the noise equivalent bandwidth of the receiver, T is the integration time and S is the smaller SNR of the two sites. The TDOA equation represents a lower bound. In practice, the system must deal with interference and multipath, both of which tend to limit the effective SNR. TruePosition's PathFinder™ algorithm utilizes proprietary super-resolution techniques to mitigate the deleterious effects of interference and multipath.

The CRLB can also be determined for Angle-of-Arrival (AoA) location techniques. Theoretically, the CRLB can be expressed as:

$$AoA_{CRLB} = \frac{6}{m^3(T)SNR}$$

where m is a quantity proportional to the size of the AoA array in wavelengths, T is the integration time, and SNR is the signal-to-noise ratio.

The geometry of the receiving sites with respect to the transmitter's location may also influence the accuracy of the location estimate. A relationship exists between the location error, measurement error and geometry. The effect of the geometry is represented by a scalar quantity that acts to magnify the measurement error or dilute the precision of the computed result. This quantity is referred to as the Horizontal Dilution of Precision (HDOP) and is the ratio of the RMS position error to the RMS measurement error σ. Mathematically, the quantity can be written as (see Leick, A., "GPS Satellite Surveying," John Wiley & Son, 1995, p. 253):

$$HDOP = \sqrt{\frac{\sigma_n^2 + \sigma_e^2}{\sigma^2}}$$

where $\sigma_n^2$ and $\sigma_e^2$ are the variances of the horizontal components from the covariance matrix of the measurements. Physically, the best HDOP may be realized when the intersection of the hyperbolas is orthogonal. An ideal situation may arise when the emitter is at the center of a circle and all of the receiving sites are uniformly distributed about the circumference of the circle.

FIG. 1 is a graphical depiction of an exemplary implementation incorporating Inter-RAT location determination. As shown in the figure, multi-mode mobile device 101 is in communication with a serving cell 119 via a first radio link 111 using a first radio channel, bandwidth, modulation and protocol. Mobile uplink transmissions 106 108 111 are detectable by a first local cluster of at least three neighboring and proximate LMUs 113 and thus can be used to develop a Time-Difference-of-Arrival (TDOA) location estimate, a Angle-of-Arrival (AoA) location estimate, a hybrid TDOA/AoA location estimate, or contribute to a hybrid TDOA/GPS location calculation. As shown, the first local LMU cluster 113 is co-located with base stations 119 120 121. Inclusion of standalone LMUs with dedicated antenna, power and backhaul facilities may be provided in an alternative embodiment. In various embodiments disclosed herein, an LMU that is optionally integrated with additional antenna, power and backhaul facilities and other functions associated with a base station may generally be referred to as a sensor station. The choice of whether to integrate the functionality of the LMU with the base station and its associated radio access technology is left to the designer. Then principles disclosed herein are applicable to sensor stations comprised of LMUs, LMUs integrated with base station functionality, and LMU's co-located with the base station.

The SMLC 115 may coordinate the LMU tasking via the SMLC-to-LMU packet data links 114. The SMLC 115 also receives the LMU timing data, other collateral information such as GPS pseudoranges, mobile collected Cell-ID, and timing or power measurements if available. The SMLC 115 also produces the final location estimate. The SMLC 115 may either push an autonomous location (produced in response to a pre-set trigger) to a Wireless Communications Network node (such as the MPC or GMLC, not shown) or respond to a prior Location Request from an external location services node (not shown). The SMLC 115 may maintain multiple digital packet communications links 116 117 with served Wireless Communications Network(s) or external location services node(s).

During a communications session when the mobile device is on either a control or traffic channel, the SMLC 115 may request that a second location estimate be developed on a second radio air interface supported by a local Wireless Communications Network and the Multi-mode Mobile Device 101. The SMLC 115 may signal the serving Wireless Communications Network, normally the Mobile Switching Center (MSC), that use of a second radio access technology (RAT) is requested. The mobile station may be signaled by the WCN and a redirection (if currently on a control channel) or a handoff (if the mobile is currently on a traffic channel) may be performed by the mobile device 101 and the WCN.

Once the mobile device 101 begins using the second radio air interface, the SMLC 115 may task a second cluster of LMUs 113 118. The selection of LMUs used for the second location estimate may be identical or different based on the network topology, local radio conditions, base station supported technologies or even LMU capabilities for radio access technology or supported frequency bands. In the graphical depiction shown in FIG. 1, multi-mode LMUs 113 are co-located with multi-mode (possibly multi-band) base stations 119, 120 121. As an illustrative example, a single, representative single-mode LMU 118 is shown co-located with a single-mode, single band base station 122 which in this depiction is associated with the second radio air interface.

Once the second cluster of LMUs 113 118 is tasked, radio uplink signals 107 109 110 112 collected, and a location developed, the SMLC 115 may mathematically combine both estimates, or select the best location estimate on the basis of quality metrics. Quality metrics may include, for example, the confidence radius of each location estimate or the remaining residual error of the individual weighted least squares calculation of the location estimate. Once a final location calculation is developed, the SMLC 115 may either push an autonomous location (produced in response to a pre-set trigger) to a Wireless Communications Network node (such as the MPC or GMLC, not shown) or respond to a prior Location Request from an external location services node (not shown).

As previously described in commonly assigned U.S. Pat. No. 6,503,428 "Multiple Pass Location Processing," a multi-pass approach can be used to reduce the latency associated with estimating the location by delivering a first and second location based on a requested quality of service. In this example, the first and second locations are based on signals collected from different frequency bands using differing radio technologies, different network topologies and different receiving LMUs.

Figure 2:
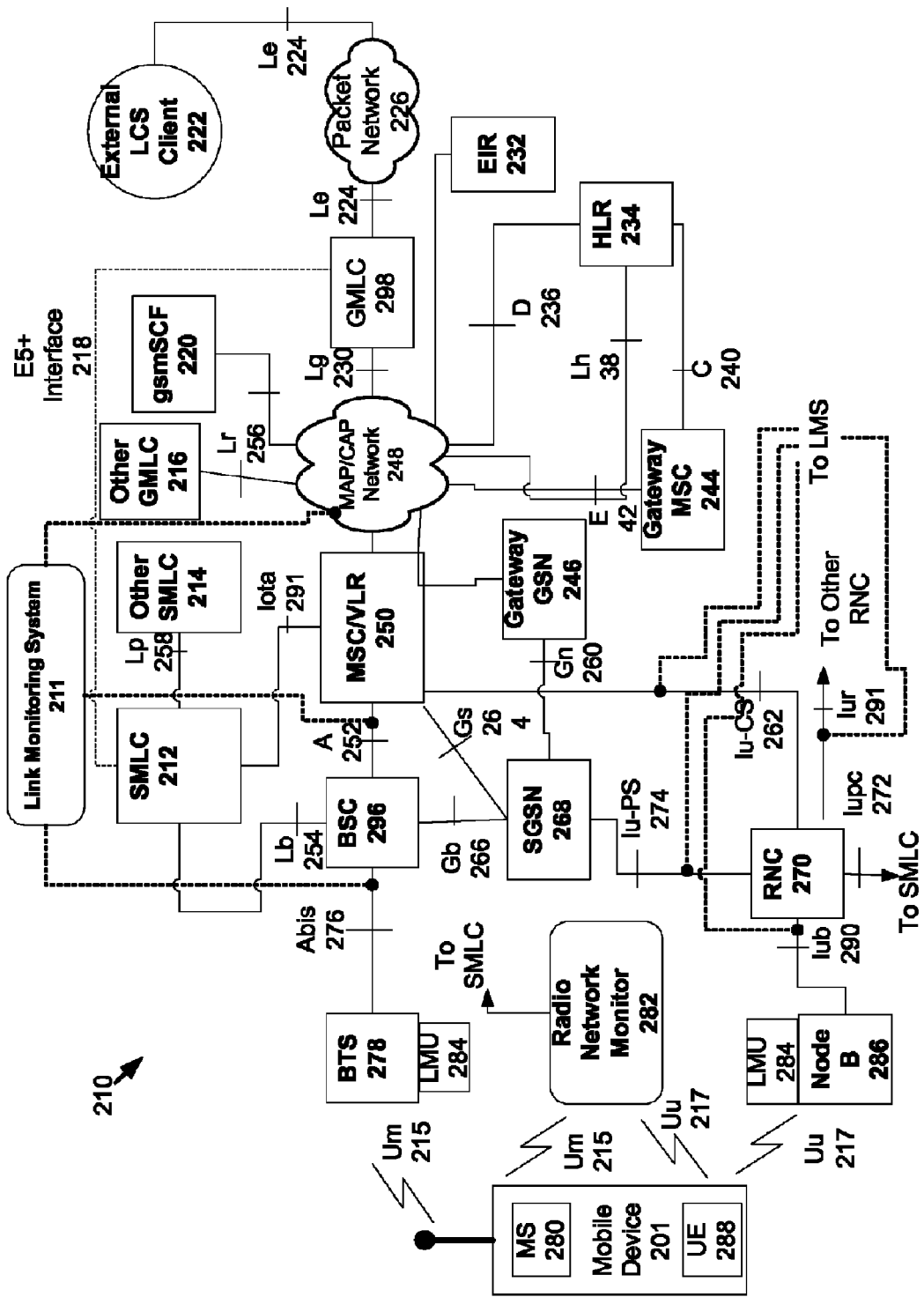
FIG. 2 schematically depicts a representative dual mode (GSM and UMTS) wireless communications network with an overlay TDOA, TDOA/AoA wireless location system using a multi-location technology SMLC, Link monitoring system and Radio Network Monitor.

Referring to FIG. 2, the Wireless Communications Network 210 may also signal the SMLC 115 before an Inter-RAT handover is performed during the normal course of the Wireless network's internal mobility management or radio resources management operations. The Inter-RAT trigger (either enacted by a Wireless Intelligent Network type trigger or customized application program nominally resident in the MSC 250) may be set in the MSC for mobiles devices with a location in progress, but can also be set for all mobiles performing an Inter-RAT handover.

Alternately, the SMLC 115 may be informed by the LMS 211 or RNM 282 of a pending or in-progress Inter-RAT handover for a mobile device of interest (a mobile device 201 for which a pre-existing passive location trigger is set in the LMS/RNM or a mobile either with a location signal collection in progress or pending).

Once the SMLC 115 is informed of a pending Inter-RAT handover, the SMLC 115 may reschedule the location and resources and initiate a location determination on either or both of the air interfaces.

FIG. 2 depicts the architecture of an illustrative GSM EDGE Radio Access Network (GERAN)/UMTS Terrestrial Radio Access Network (UTRAN) network reference model 210 with a Radio Network Monitor (RNM) 282, LMS 211 and the Iota 291 interface. The figure also shows the dual-mode mobile device 201 that contains both the MS 280 and UE functionality 288 allowing access and use of both or either the GSM Um 215 and/or UMTS Uu 217 radio air interfaces.

The Iota 291 interface is an embodiment based on the standardized interfaces shown in FIG. 2. Using the Iota 291, the Wireless Communications Network can signal the Wireless Location Network (in this case the SMLC 212) when triggers (e.g. dialed digits, subscriber ID, or mobile ID) are met. Using the Iota 291 interface the Wireless Location Network can signal the Wireless Communications Network for radio information and to indicate that a Inter-RAT handoff is requested. The Iota 291 provides a set of capabilities and may not provide a direct wired interface. In the present exemplary dual-mode network the Iota 291 interface is shown as coupling the SMLC to the MSC, but in various embodiments the interface may connect the MSC to the MPC, the GMLC, the gsmSCF or any Intelligent Peripheral on the Wireless Intelligent Network. In one embodiment the Iota interface may be a non-standard (or enhancement of a standardized) digital packet interface using an extension of the existing Wireless Intelligent Network protocols (e.g., IS-41, WIN, CAMEL) to interconnect the MSC 250 and the SMLC 212. Use of the Iota 291 interface may allow the MSC 250 to quickly query the SMLC 212 for location information and allow the SMLC 212 to request an Inter-RAT handover. Use of a modified Wireless Intelligent Network protocol may allow the SMLC 212 to communicate with multiple MSCs 250 in the case where an Inter-RAT handoff is requested. Some capabilities of the Iota 291 interface may be included in the ETSI/ANSI IS-41 E2 interface as defined in Joint Standard 36 (J-STD-036) ("Enhanced Wireless 9-1-1 Phase 2").

Radio Network Monitor (RNM) 282 is a wideband multi-channel radio receiver effectively comprising a bank of ad hoc tunable narrowband receivers. The receivers may be tunable to both the uplink and downlink channels anywhere in the frequency band. The RNM 282 was implemented on the TruePosition® AnyPhone™ Location Mobile Unit (LMU) radio receiver platform (the present LMU was previously described in U.S. Pat. No. 6,782,264 as a narrowband embodiment of the receiver module for the SCS). The RNM may use its radio receivers to collect signaling to trigger the wireless location system.

The LMS is an embodiment of the Abis monitor described in U.S. Pat. No. 6,782,264 and may be configured to monitor the Abis and A interfaces, the GSM-MAP, Iub, Iu-PS and Iu-CS interfaces, and in some cases the Iur interface. The LMS may be implemented, with modifications, on the same hardware/software chassis as the Abis Monitor (a set of custom applications with unmodified Agilent Access7 software application running on a cluster of Intel TSEMT2 or TSRLT2 UNIX servers). The LMS passively monitors message traffic within the wireless communications system and triggers the wireless location system based on pre-set criteria.

LMS 211 and RNM 282 triggering of the wireless location system is further detailed in commonly assigned U.S. patent application Ser. No. 11/150,414 "Advanced triggers for location-based service applications in a wireless location system." Detection of events such as handover is detailed in U.S. Pat. No. 6,119,000, "Method and apparatus for tracking identity-code changes in a communications system."

The network 210 further includes a Serving Mobile Location Center (SMLC) 212. The RNM 282 is the primary component that can be deployed at a carrier's cell site. The RNM 282 may be implemented as a distributed network of radio receivers capable of receiving RACH and SDCCH messages for autonomous generation of location services. The RNM 82 tunes to directed frequencies to gather data for the system. The RNM 282 can then forward the collected data to the SMLC 212. RNMs 282 in a network may be time and frequency synchronized through the use of the Global Positioning Satellite (GPS) constellation (not shown).

The SMLC 212 may be a high volume location-processing platform. The SMLC 212 may contain U-TDOA and multi-path mitigation algorithms for computing location, confidence interval, speed, and direction of travel. The SMLC 212 may also determine which wireless phones to locate based upon triggering from the Link Monitoring System (LMS) 211 or requests from the Lb interface 254 to an infrastructure vendor's Base Station Controller (BSC) 296 (or MSC 250 in some cases as the Ls interface). The SMLC 212 is typically co-located at the operator's BSC 296 but can also be remotely distributed. The primary functions of the SMLC 212 are to receive reports on signal detection from the RNMs 282, to perform location processing, and to calculate the location estimate for each signal. The SMLC 212 manages the network and provides carrier access to location records. The SMLC 212 is responsible for the collection and distribution of location records. The SMLC 212 also maintains configuration information and supports network management.

The LMS 211 continuously monitors all Abis signaling links 276 (and in some cases A-interface links 252 and GSM Mobile Application Protocol (GSM-MAP) 248 interface) in a network 210 to which the LMS 211 is connected. The function of the LMS 211 is to capture messages in the call (e.g., a GSM voice conversation, an SMS transaction or a GPRS data session) and SMS setup procedure, mid-call control messages, and call termination and release messages for MSs 280 and/or UEs 288. The LMS 211 then forwards the data contained in those messages to the SMLC 212 for subsequent location processing.

The GSM service control function (gsmSCF) 220, also called a service control point (SCP), may contain database and logical rules for providing non-call oriented services to a subscriber. The gsmSCF 220 may connect to the MSC(s) and GSN(s) via CAMEL Application Part (CAP) 263 connections over the SS7 network 249. The GSM Mobile Application Protocol (GSM-MAP) 248 may be the communications medium for call-related control services on the wired part of a wireless network. The GSM-MAP 248 may provide services such as automatic roaming, authentication, location services intersystem hand-off, and short message service routing on a GSM or UMTS network. Wireless network elements such as the MSC 250, HLR 234, VLR (shown here as part of the MSC 250), GMSC 244, EIR 232, GMLC 298, and gsmSCF 220 may use this messaging protocol to communicate to one other. The GSM-MAP 248 may reside on the international Signaling System 7 (SS7) network (the MAP-CAP network 249).

The Gateway Mobile Location Center (GMLC) 298 is defined by 3GPP standards as the clearinghouse for location records in a GSM/GPRS/UMTS network. The GMLC 298 serves as a buffer between the tightly controlled SS7 network 249 and the public internet. Authentication, access control, accounting, and authorization functions for location-based services are commonly resident on or controlled by the GMLC 298.

The Le interface 224 is an IP-based XML interface originally developed by the Location Interoperability Forum (LIF) and then later standardized by the 3rd Generation Partnership Program (3GPP) for the GSM EDGE Radio Access Network (GERAN) and the UMTS Terrestrial Radio Access Network (UTRAN). The Location-based services (LBS) client 222 is also known as a LCS (Location Services). The LBS and LCS 222 are software applications and services configured to use the location of a mobile device.

The E5+ interface 218 is a modification of the E5 interface defined in the Joint ANSI/ETSI Standard 036 for North American E9-1-1. The E5+ interface 218 connects the SMLC 12 and GMLC 98 nodes directly allowing for push operations when LMS 211 or RNM 282 triggers are used by the wireless location system with either network acquired information (e.g., cell-ID, NMR, TA, etc.) or via TDOA and/or AoA performed by specialized receivers.

User equipment (UE) 288 may be defined as equipment, for example as a UMTS mobile device. NodeB 286 is the UTRAN network interface to the UMTS radio interface. The RNC 270 may perform autonomous radio resource management (RRM) by UTRAN. The RNC 270 may perform the same functions as the GSM BSC and provide central control for the RNS elements (RNC and Node Bs). The RNC 270 may handle protocol exchanges between Iu-PS 274, Iu-CS 262, Iur 261, and Iub 290 interfaces and may be responsible for centralized operation and maintenance of the entire radio network system. The RNC 270 may communicate with other RNC's directly via the standardized Iur interface.

The Serving GPRS Support Node (SGSN) 268 may monitor the location of individual GPRS capable Mobile Stations 280 and performs basic security functions and access control functions. The SGSN 268 can serve both the Global System for Mobility GERAN and UMTS radio networks.

The Gateway GPRS Support Node (GGSN) 246 may act as a system routing gateway for the GPRS network. The GGSN 246 may provide a connection to external packet data networks (e.g., public internet) and may perform the task of billing, routing, security firewalling, and access filtering. The Gateway MSC (GMSC) 244 may act as a bridge for roaming subscribers to visited MSCs in other operator's networks. Both control signaling and traffic trunks may be set up via the GMSC 244.

The Um 215 is a GSM radio interface. The Uu 217 is a UMTS radio interface. The Tub interface 290 may be located on a UMTS network and found between the RNC (Radio Network Controller) 270 and the NodeB 286. The Iupc 272 may interconnect the UMTS RNC 270 with the SMLC (also called the SAS) in the UMTS network for location estimation generation. The Iu-CS (Circuit Switched) interface 262 may connect the UMTS RNC 270 with the circuit switched communications oriented network (the MSC 250). The Iu-PS (Packet Switched) interface 274 may connect the UMTS RNC 270 with the packet switched communications oriented network (SGSN) 268. The Gb interface 266 may interconnect the BSC 296 with the SGSN 268 allowing for routing of GPRS communications.

The Gn interface 260 may be a GPRS network packet data interface and located between the SGSN 268 and GGSN 246. The Gs interface 264 may be a GPRS system interface located between the SGSN 268 and the MSC 250. The Gr (not shown) interface may be a GSM-MAP interface is located between the SGSN 268 and the Home Location Register (HLR) 234 carried on the SS7 network 249.

As described in U.S. Pat. No. 6,782,264, the base transceiver station (BTS) to base station controller (BSC) link (e.g., the Abis link) may be monitored for triggering messages and information fields. In an embodiment, a passive network monitor called the AMS (Abis Monitoring System) in the '264 patent and exemplified by monitoring the GSM Abis interface may be extended in accordance with the present disclosure and called the Link Monitoring System, or LMS. The Link Monitoring System (LMS) 211 may monitor multiple cellular network data links simultaneously, scan for data of interest, and detect particular messages or data fields within messages. Setting or tasking of messages or data fields of interest may take place at any time. When a match occurs, the LMS 211 may be further triggered to perform a pre-set action, such as a write to storage memory or forwarding of the triggering message and (or) data fields to another system node.

The Radio Network Monitor 282 may extend the concept of passive monitoring for location triggering information and messaging to the radio air interface. The RNM 282 may detect and monitor both uplink (mobile device to BTS or NodeB) and downlink radio communications.

The Mobile Device 201 may contain dual mode functionality to access multi-technology wireless communications networks or disparate wireless communications networks using disparate radio access technologies. As shown in FIG. 2, the Mobile Device 201 may contain both the GSM Mobile Station (MS) 280 and UMTS User Entity (UE) 288 functionality. The Mobile Device 201 normally implements both functionalities using common circuitry and computational faculties.

Figure 3:
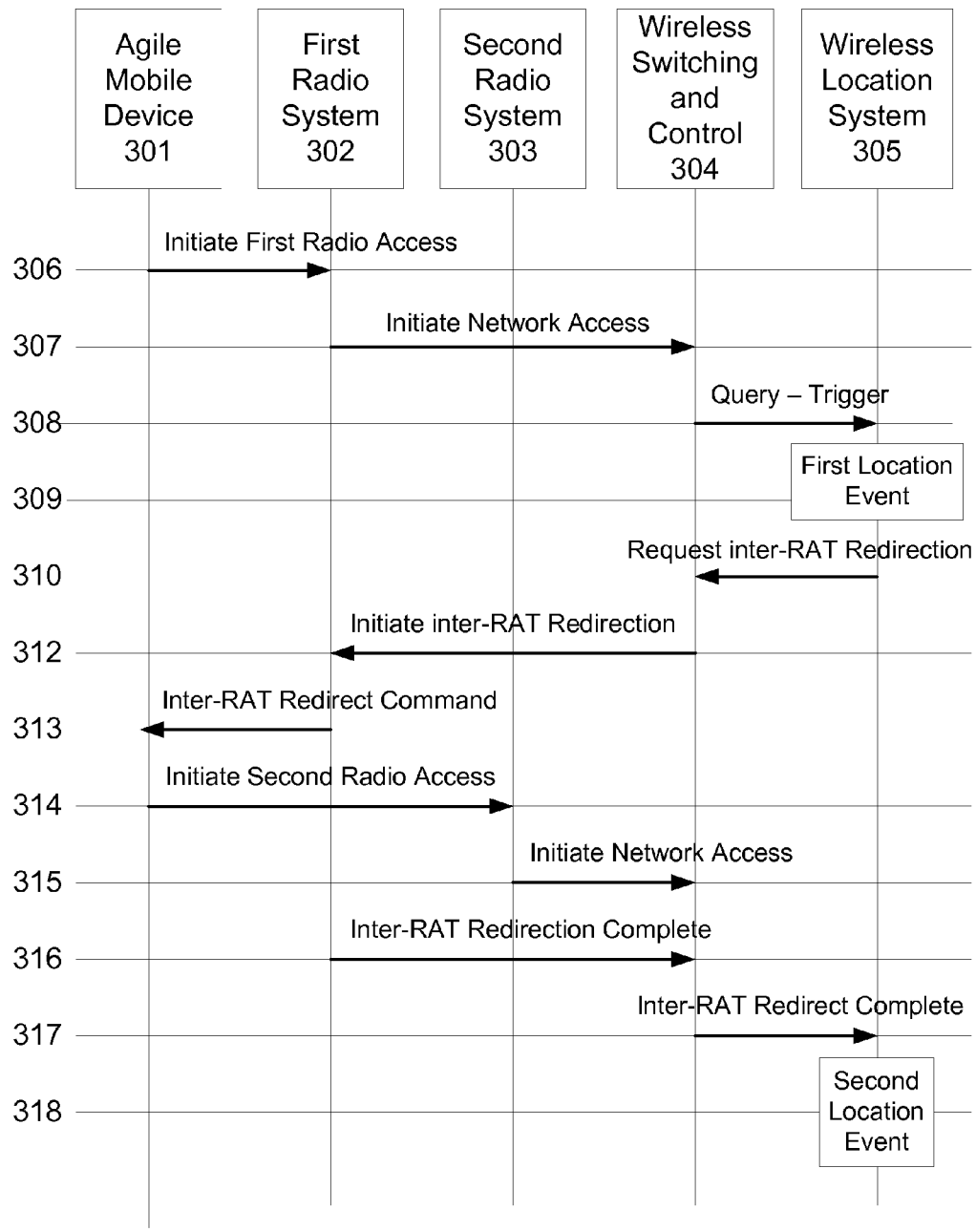
FIG. 3 depicts an example of the events and messaging associated with an Inter-RAT redirection on the control channel for start of call or control-channel only location events.

FIG. 3 depicts an exemplary illustration of Inter-RAT redirection on a control channel. Location on a control channel may be useful for low-latency location-based services or for control channel-only events. Inter-RAT Redirection provides a method for causing the agile mobile device 301 to reselect a different radio access technology. The term "agile" may refer herein to a multi-mode, multi-band mobile voice/data device.

The diagram in FIG. 3 depicts representative events in the control-channel Inter-RAT location operation. Each event shown may consist of multiple bi-directional messages to multiple nodes within the wireless communications network and the wireless location system. Some depicted events are optional while in some technology or operator implementations the sequence of events may occur in a different order.

For simplicity, a first radio access technology may be associated with the First Radio System 302 while a second radio access technology may be associated with a Second Radio System 303. In this example, the Wireless Switching and Control 304 associated with the Mobile Switching Centers, Packet Switching Networks, Intelligent Networks, Radio Resource Control, and Mobility Management is depicted as a single functional entity. The Wireless Location System 305 is a multi-mode system and can include a variety of mobile-based, network-based, satellite-based, and/or hybrid positioning technologies.

In this example, the Mobile 301 may begin a call using a first Radio Access 306 using the radio resources provided by the First Radio System 302. This first network access may be associated with a mobile originating event or in response to a network broadcast event such as a page. Exact network access messaging may vary depending on the radio access technology and operator.

The First Radio Access 306 information may be passed to the Wireless Switching and Control 304 entity in a message set shown here as Initiate Network Access 307. The Wireless Switching and Control 304 entity may allocate resources and update data stores in preparation of subsequent processing. The Wireless Switching and Control 304 may query the Wireless Location System for location of the mobile device 301 in response to an internal trigger. Examples of triggers include dialed digit analysis or Intelligent Networking triggers.

The Wireless Location System 305 may perform a location event 309. The location event may comprise a first set of measurements. In other embodiments, the location event may comprise a first position estimate based on the first set of measurements. Based on one or more of: pre-set rules, location event type, or dynamic quality of service information analysis, the Wireless Location System 305 may determine to request a second control channel. Using Iota interface 291 the Wireless Location System 305 may signal the Wireless Switching and Control 304 entity that an Inter-RAT redirection is requested 310.

The Wireless Switching and Control 304 may signal the first radio system 302 to initiate Inter-RAT redirection 312. The first radio system 302 may command the mobile device 301 to perform the Inter-RAT redirection 313. In response to the Inter-RAT redirection 313 the mobile device 301 may initiate access 314 on the second radio system 303.

The information acquired in the Second Radio Access 314 may be passed to the Wireless Switching and Control 304 entity in a message set shown as Initiate Network Access 315.

The First Radio System 302 may optionally provide a signal that the Inter-RAT redirection is complete 316.

The Wireless Switching and Control 304 entity may then allocate resources and update data stores in preparation for services associated with the second access. The Wireless Switching and Control 304 entity may signal the Wireless Location System 305 that the Inter-RAT redirection is complete 317 after which the Wireless Location System can perform a second Location 318. The location event may comprise a second set of measurements. In other embodiments, the location event may comprise a second position estimate based on the second set of measurements.

Figure 4:
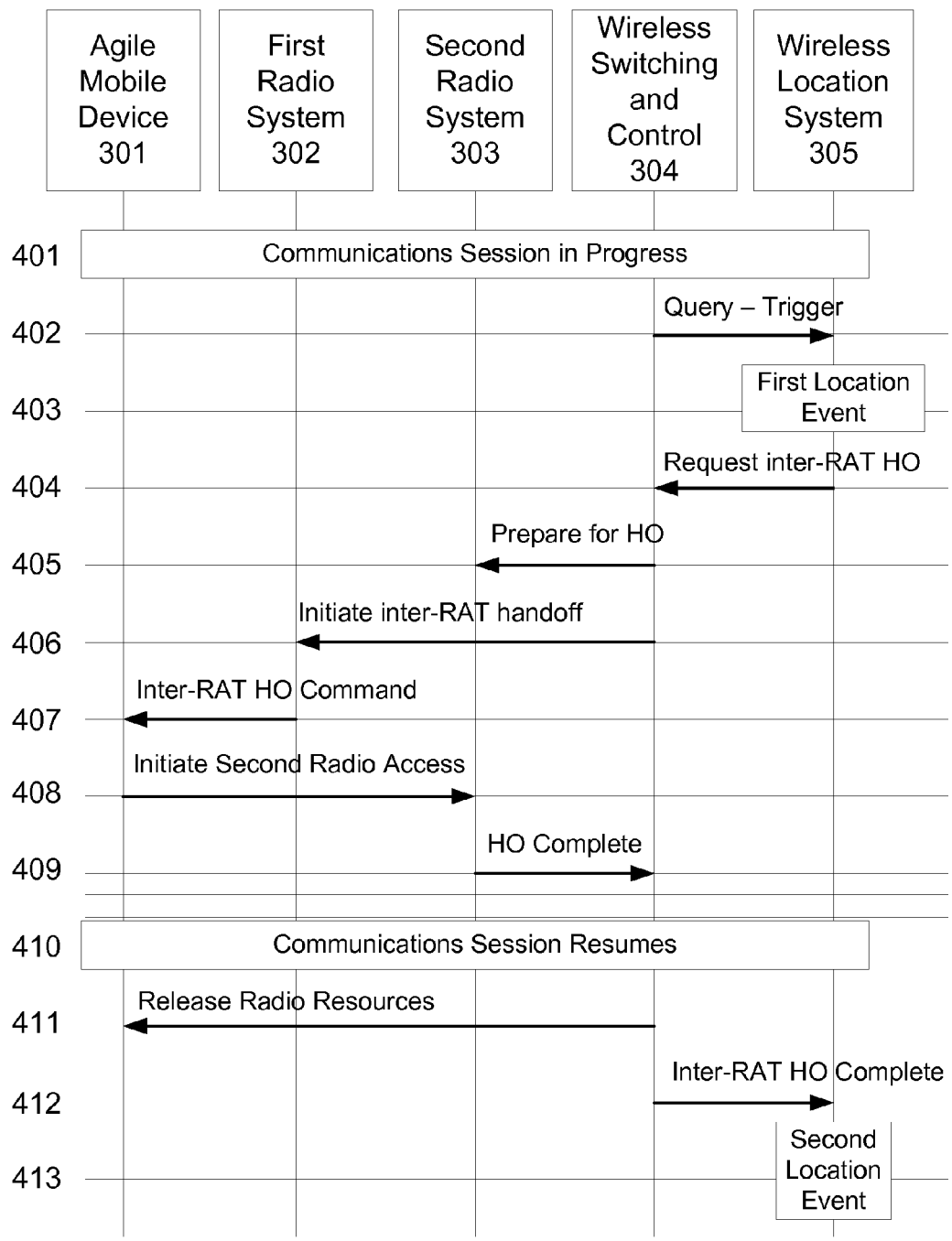
FIG. 4 depicts an example of the events and messaging associated with an Inter-RAT handoff on the traffic channel for mid-call location events.

FIG. 4 depicts an exemplary sequence of events associated with the Inter-RAT location determination performed on a call in progress (or data session in progress) where a traffic channel has been allocated for use. This scenario may be called a 'mid-call' location determination.

The diagram in FIG. 4 illustrates representative events in the mid-call Inter-RAT location operation. Each event may consist of multiple bi-directional messages to multiple nodes within the wireless communications network and the wireless location system. Some depicted events are optional, and in some embodiments the sequence of events may occur in a different order.

In various embodiments, an Inter-RAT handoff provides a method for causing the agile mobile device 301 to select a second radio access technology without interrupting the current call or data session.

For simplicity, a first radio access technology may be associated with the First Radio System 302 while a second radio access technology may be associated with a Second Radio System 303. In this example, the Wireless Switching and Control 304 associated with the Mobile Switching Centers, Packet Switching Networks, Intelligent Networks, Radio Resource Control, and Mobility Management is depicted as a single functional entity. The Wireless Location System 305 is a multi-mode system and can include a variety of mobile-based, network-based, satellite-based, and/or hybrid positioning technologies.

In the current example, the mobile device 301 may be on a call/data session 401 and channel resources may have been allocated for the session. In response to an external application or to an internal trigger event (e.g., an Intelligent Networking trigger), the Wireless Switching and Control 304 entity may request a location event 402 for the mobile device 301.

The Wireless Location System 305 may perform a first location event 403. The location event may comprise a first set of measurements. In other embodiments, the location event may comprise a first position estimate based on the first set of measurements. Based on one or more of: pre-set rules, location event type, or dynamic quality of service information analysis, the Wireless Location System 305 may determine that a second mid-call location should be requested using a second available radio access technology. Using Iota interface 291 the Wireless Location System 305 may indicate to the Wireless Switching and Control 304 entity that an Inter-RAT handoff is requested 404.

The Wireless Switching and Control 304 may indicate to the second radio system 302 that an incoming handoff 405 may be expected and provide information to continue the call without interruption.

The Wireless Switching and Control 304 may command the first radio system 302 to initiate an Inter-RAT handoff 406. The first radio system 302 may command the mobile device 301 to perform an Inter-RAT redirection 407. In response to the Inter-RAT redirection 407 the mobile device 301 may initiate access 408 on the second radio system 303.

Once the second radio system access 408 is complete, the second radio system 303 may inform the Wireless Switching and Control 304 entity of the successful handoff and the communication session can resume 410 without interruption.

Once the handoff is complete, the Wireless Switching and Control 304 entity may release resources 411 on the first radio system 302.

The Wireless Switching and Control 304 entity may inform the Wireless Location system 305 of the successful handoff 412 whereupon a second Location Event 413 can proceed. The Location Event 413 may comprise a second set of measurements. In other embodiments, the Location Event 413 may comprise a second position estimate based on the second set of measurements.

Figure 5A:
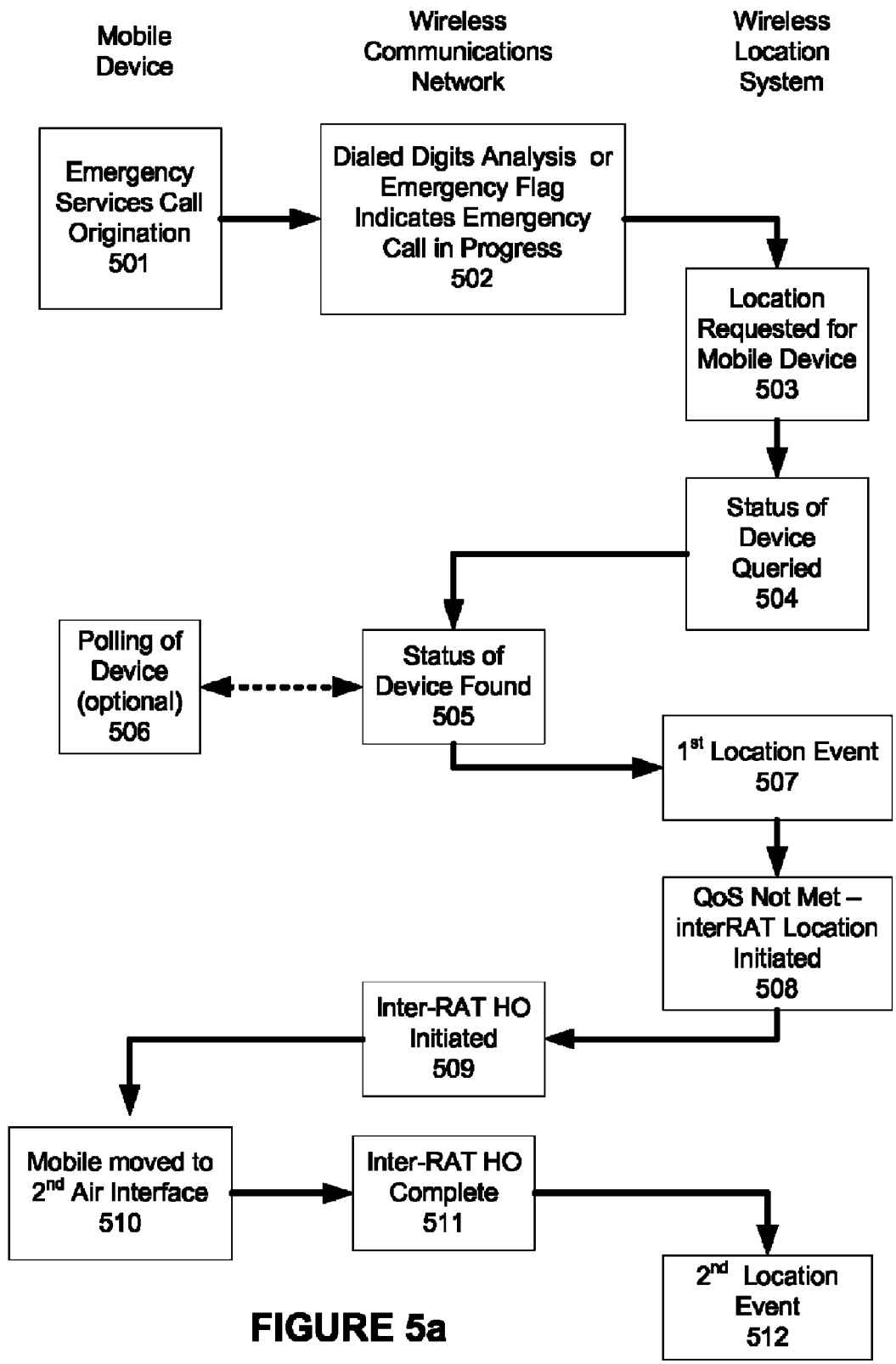
FIGS. 5a and 5b depict an example of the events associated with use of Inter-RAT in locating an Emergency Services call.
Figure 5B:
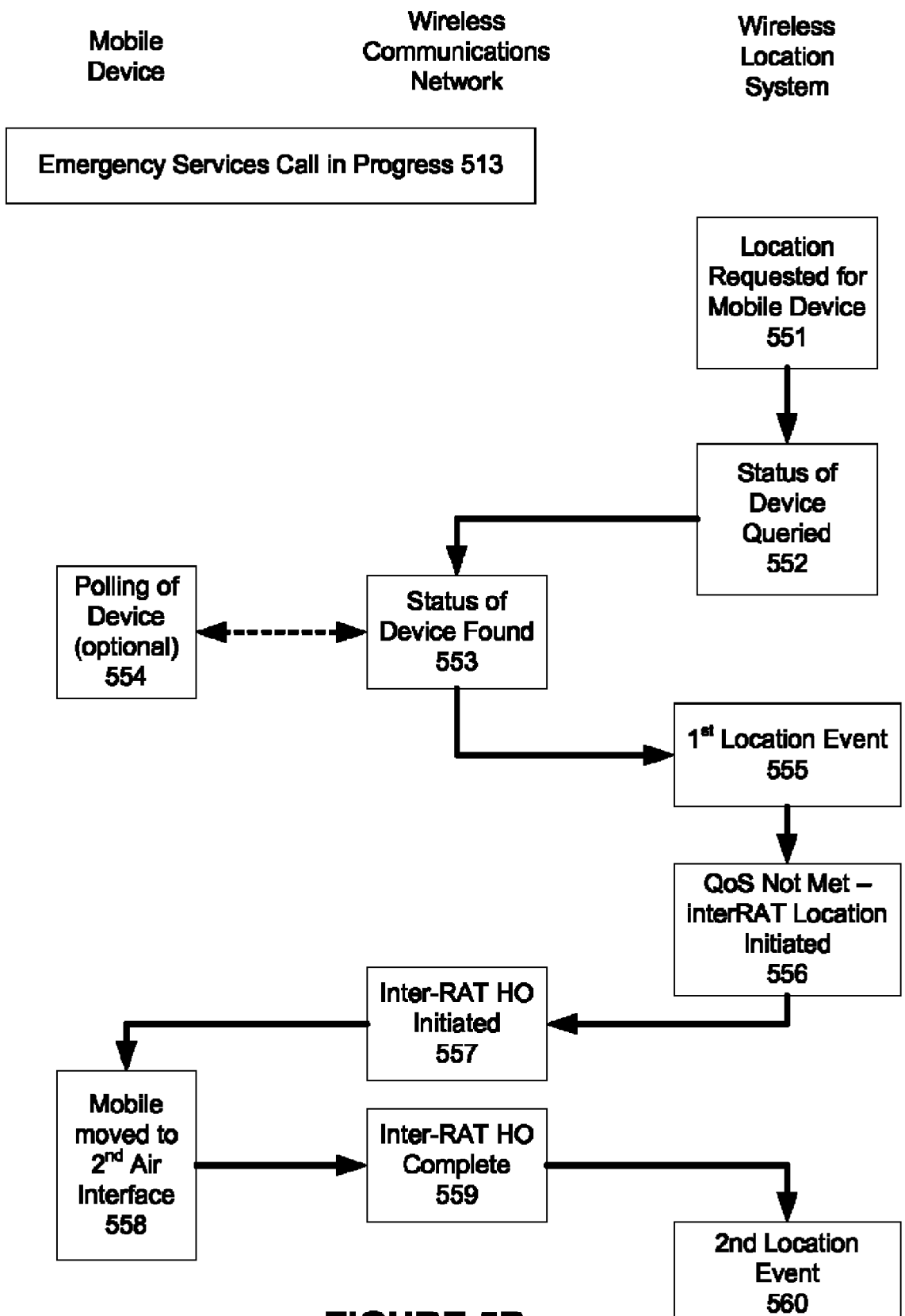

FIGS. 5a and 5b depict an exemplary sequence of events associated with the inter-RAT location performed on an Emergency Services voice call.

In FIG. 5a, the MSC may perform analysis of all mobile originated calls for indication of an Emergency Services call (generally dialed digit analysis or an presence of an emergency services flag).

Due to the speed at which the MSC can signal the WLS using a dialed-digit trigger (or if the Wireless Communications Network is equipped with an LMS or similar triggering platform), a first location estimate can be performed using only the control channel (as described in commonly assigned U.S. Pat. No. 5,327,144; "Cellular Telephone Location System"). The inter-RAT functionality may then be invoked, allowing for a second location estimate using a second control channel with differing radio characteristics. The second location estimate may be performed before the conversation state or data session is initiated for the mobile device to-be-located.

As shown in FIG. 5a, the mobile device may originate an emergency services call 501. The Wireless Communications System (WCN) may identify the emergency call 502 and launch special call treatment. In this example, both the mobile device and Wireless Communications Network are multi-mode and capable of supporting more than one radio access technology. As part of the special call treatment, the Wireless Communications Network may send a Location Request 503 to the Wireless Location System for the location of the mobile device. The WLS must obtain channel information and determine whether the mobile device is capable of inter-RAT operation prior to beginning the location event. Accordingly, if the channel information and mobile device's inter-RAT capability is not included in the original Location Request 503 (or developed by an installed monitoring system), a query for the inter-RAT capability is launched by the WLS 504. The WCN may provide the mobile device's inter-RAT capability 505 if known, and other may query the device 506 as to the device's inter-RAT capability. Regardless of the inter-RAT capability, a first location event may be performed 507. The location event may comprise a first set of measurements. In other embodiments, the location event may comprise a first position estimate based on the first set of measurements. If the first location event does not meet the requested quality (e.g., nominal accuracy), then an Inter-RAT location may be initiated 508. The inter-RAT request may cause the WCN to initiate an inter-RAT handover 509 and the mobile device may hand over to a second air interface technology 510. Once the Inter-RAT handover is complete 511, the WCN may notify the WLS and a second control-channel location event may be performed 512. The location event may comprise a second set of measurements. In other embodiments, the location event may comprise a second position estimate based on the second set of measurements.

It can be seen that in multi-mode environments the inter-RAT capability may facilitate the ability to determine a second location using another frequency, radio network topology, and channel bandwidth on control channel-only events or when a lower latency is required. In an embodiment, when an Emergency Services call requests a current location after the call has been connected, the inter-RAT hand-off technique may be used to initiate a location determination on a second radio access technology if the requested location accuracy quality of service cannot be met using the current radio access technology.

FIG. 5b illustrates an exemplary traffic channel inter-RAT procedure illustrated that can be used in the event that a control channel location attempt fails, does not meet the requested location quality of service, or an updated location (also known as a "re-bid" to those skilled in the art) is required.

Referring to FIG. 5b, the traffic channel inter-RAT procedure begins with the mobile already on-channel in conversation state 513. Regardless of the source, the WLS may receive a location request 551. The WLS may query the Wireless Communications Network 552 for mobile device status including information such as serving cell and radio channel information. The information may include frequency, timeslot, spreading code, neighbor list, timing information and signal strength and/or quality depending on the location technology available to the WLS. The WCN may have the channel information and inter-RAT capability of the mobile device 553 available in an internal database.

The WCN may optionally interrogate the mobile device 554 to collect the requested information or update its internal database. Once the WLS has received the requested information from the WCN and as needed from sensors and/or monitors deployed in the WCN, a first location event be performed 555. The location event may comprise a first set of measurements. In other embodiments, the location event may comprise a first position estimate based on the first set of measurements.

The WLS may call for an inter-RAT handover before initiation of the first location if it is determined that the likelihood of meeting the requested quality for the mobile device's location is sufficiently unlikely. Such a determination may be made, for example, by using the past history of determining location estimates using the first and second air interfaces, or using information on the network topology and location capabilities of the first and second wireless networks. If the first location estimate is performed on the first air interface and the estimate does not meet the desired quality-of-service (QoS), the WLS may determine that a second location estimate should be initiated and request that an inter-RAT handover be performed. The determination may be based on the WLS's knowledge of the quality of the first location, location error factors, past history of successful location on the first and second air interfaces, and information on the network topology and location capabilities of the first and second wireless networks. At the request of the WLS, the WCN may initiate the inter-RAT handover 557 and the mobile device may be handed over to the second air interface 558. The WCN may confirm that the inter-RAT is complete 559 whereupon the WLS may be informed and a second location event performed 560. The location event may comprise a second set of measurements. In other embodiments, the location event may comprise a second position estimate based on the second set of measurements.

As mentioned, using the inter-RAT redirection mechanism, various methods for performing a second location event using the traffic channel using another frequency, radio network topology, and channel bandwidth to determine a single location may be implemented. In various embodiments the disclosed methods may allow for multi-pass location on multiple traffic channels, each with different characteristics allowing for optimization of the location determination in post processing.

Figure 6:
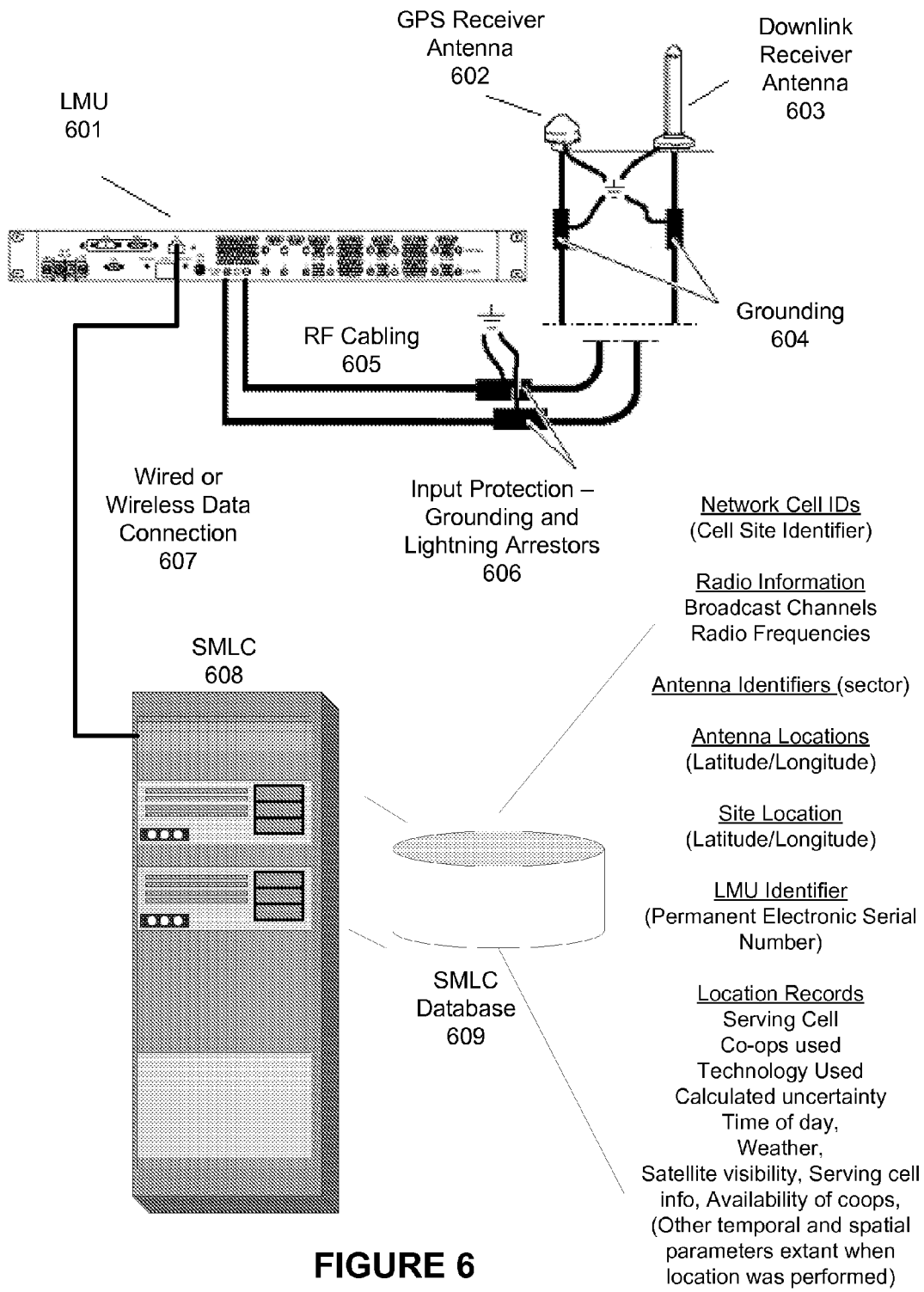
FIG. 6 depicts exemplary subsystems of a Wireless Location System.

FIG. 6 schematically depicts an exemplary deployment of an overlay WLS comprising an LMU 601; GPS receiver antenna 602; downlink receiver antenna 603; grounding 604 and input protection 606 to safely interface the LMU 601 to the exterior mounted antennae 602, 603; SMLC 608 and SMLC database 609; and radio frequency cabling 605. As shown, the LMU 601 is connected to the SMLC 608 via a wired or wireless connection 608, which may carry TCP/IP packet-based communications. The SMLC 608 may host SMLC Database 609, which may further contain network cell identifiers, network antenna identifiers, network antenna locations, LMU (cell) locations, and LMU identifiers.

The SMLC 608 may also store, or be coupled to, a database of location records (e.g., SMLC database 609). The database of location records may be used to predict the quality of service for a location application based on the mobile device or network supplied cell-ID and proximity information (e.g., CGI+TA in GSM, CI+RTT in UMTS) prior to signal collection and/or location calculation. The database of location records may also be used as described herein to store the radio and network parameters generated by manual entry, downloading from the OSS, or developed from the GPS and/or downlink receiver subsystems.

Any of the above mentioned aspects can be implemented in methods, systems, computer readable media, or any type of manufacture.

Figure 7:
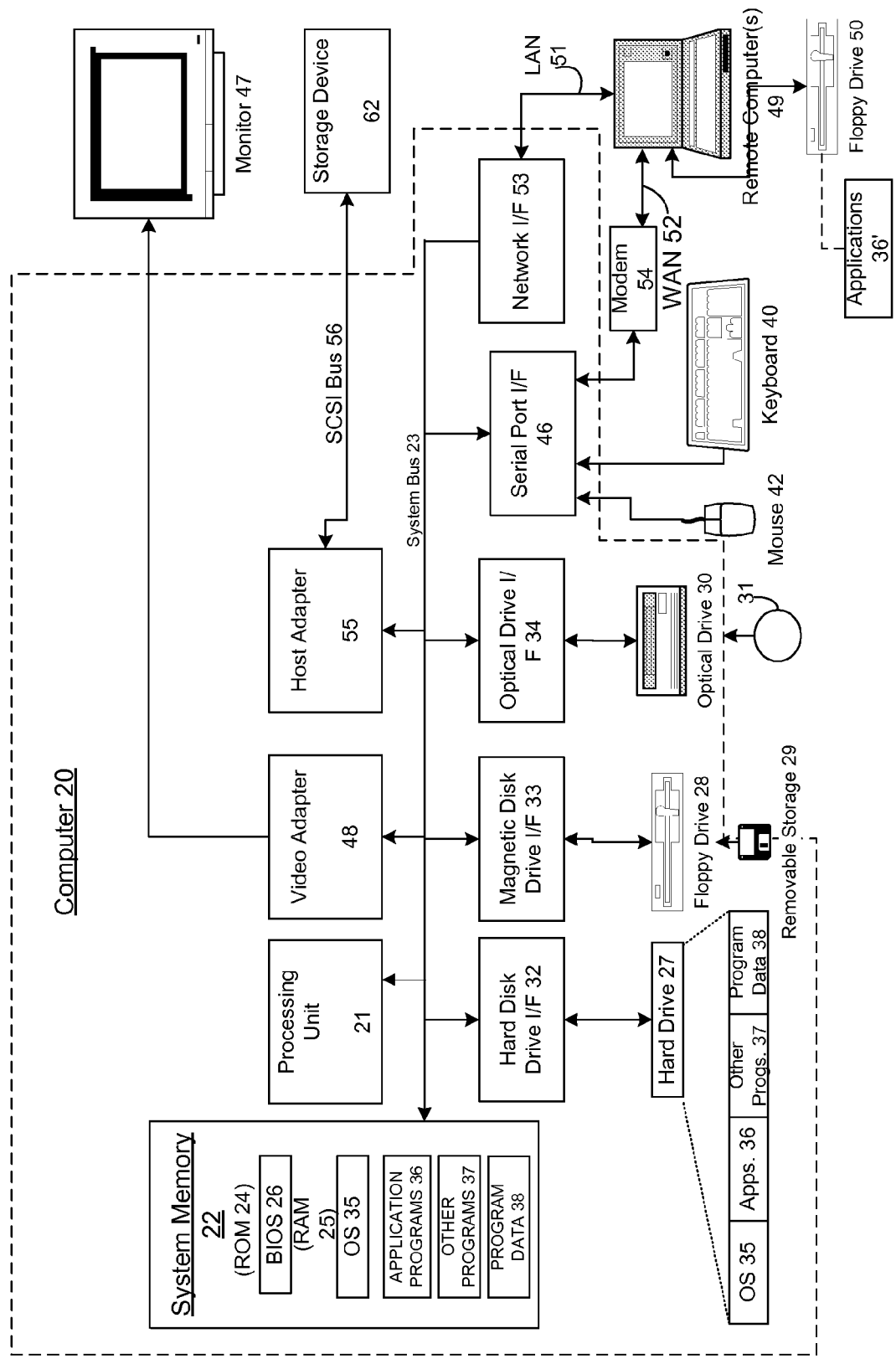
FIG. 7 depicts an example of a computing system which may be configured to implement aspects of FIGS. 1-6.

As described above, aspects of the invention may execute on a programmed computer. FIG. 7 and the following discussion is intended to provide a brief description of a suitable computing environment in which those aspects may be implemented.

The term circuitry when used in the present disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 7 depicts an example of a computing system which may be configured to implement aspects of the present disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the invention may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 7. The logical connections depicted in FIG. 7 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the invention are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, various mechanisms were disclosed for determining a location estimate for multi-mode mobile devices using measurements from one or more radio access technologies and providing a combined location solution. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for locating a multi-mode mobile communications device in a wireless communications system employing a plurality of radio access technologies, wherein the wireless communications system supports a radio access technology handover mechanism, the method comprising:
receiving first radio signal information from the multi-mode mobile communications device at a first group of sensor stations using a first radio access technology;
causing a handover of the multi-mode mobile communications device to a second group of sensor stations;
receiving second radio signal information from the multi-mode mobile communications device at the second group of sensor stations using a second radio access technology; and
determining a combined location estimate as a function of said first and second radio signal information.

2. The method of claim 1, wherein said first and second radio access technologies differ in at least one of a modulation technique, a radio network topology, or a channel bandwidth.

3. The method of claim 1, wherein said first and second radio access technologies differ in a modulation technique, a radio network topology, and a channel bandwidth.

4. The method of claim 1, further comprising executing, prior to said causing a handover, a process to determine whether to cause the handover.

5. The method of claim 4, wherein said process is based on predetermined rules.

6. The method of claim 4, wherein said process is based on a location event type.

7. The method of claim 4, wherein said process is based on a dynamic quality of service information analysis.

8. The method of claim 4, wherein said process is based on a quality of the first radio signal information.

9. The method of claim 4, wherein said process is based on location error factors.

10. The method of claim 4, wherein said process is based on a past history of location determination using the first and second sensor station groups.

11. The method of claim 4, wherein said process is based on network topology of the first and second sensor station groups.

12. The method of claim 4, wherein said process is based on location determination capabilities of the first and second sensor station groups.

13. The method of claim 4, wherein said second group of sensor stations is selected based on wireless location technology available in each sensor station of said second group.

14. The method of claim 1, further comprising:
   determining a first probable position of the multi-mode mobile communications device based on analysis of said first radio signal information;
   determining a second probable position of the multi-mode mobile communications device based on analysis of said second radio signal information; and
   determining a combined location estimate as a function of said first and second probable positions.

15. The method of claim 14, wherein said determining the first probable position or said determining the second probable position is performed using time difference of arrival (TDOA) techniques.

16. The method of claim 14, wherein said determining the first probable position or said determining the second probable position is performed using angle of arrival (AOA) techniques.

17. The method of claim 14, further comprising mathematically combining the first and second probable positions to determine said combined location estimate.

18. The method of claim 1, wherein said determining the combined location estimate further comprises selecting a best location estimate as a function of quality metrics.

19. The method of claim 1, further comprising transmitting said combined location estimate to a network node in response to a pre-set trigger.

20. The method of claim 1, further comprising transmitting said combined location estimate to a network node in response to a prior location request.

21. The method of claim 1, wherein said first radio signal information is received during a call in progress or data session in progress.

22. The method of claim 21, wherein the first radio signal information is received on a traffic channel.

23. The method of claim 1, further comprising analyzing mobile device originated calls for indication of an emergency services call.

24. The method of claim 23, wherein said second radio signal information is received during said emergency services call.

25. The method of claim 14, wherein:
   said first radio signal information is received on a first control channel;
   said second radio signal information is received on a second control channel; and
   said determining the second probable position is performed before a conversation state or data session is initiated for the multi-mode mobile communications device.

26. The method of claim 4, further comprising receiving an indication of a pending handover, wherein said process is based on said indication.

27. The method of claim 1, wherein said first and second groups comprise at least one common sensor station and the at least one common sensor station is capable of using both first and second radio access technologies.

28. A system for locating a multi-mode mobile communications device, comprising:
   a first group of sensor stations using a first radio access technology and configured to receive first radio signal information from a multi-mode mobile communications device using the first radio access technology;
   a second group of sensor stations using a second radio access technology and configured to receive second radio signal information from the multi-mode mobile communications device using the second radio access technology, wherein said first and second groups may comprise common sensor stations;
   a first subsystem comprising at least one processor and at least one storage medium communicatively coupled to said at least one processor, the storage medium having stored therein computer-executable instructions for instructing the processor to implement a radio access technology handover mechanism;
   a second subsystem comprising at least one processor and at least one storage medium communicatively coupled to said at least one processor, the storage medium having stored therein computer-executable instructions for instructing the processor in performing the following steps:
   receiving said first radio signal information;
   transmitting a request for a radio access technology handover;
   receiving said second radio signal information; and
   determining a combined location estimate as a function of said first and second radio signal information.

29. The system of claim 28, wherein said first and second radio access technologies differ in at least one of a modulation technique, a radio network topology, or a channel bandwidth.

30. The system of claim 28, wherein said first and second radio access technologies differ in a modulation technique, a radio network topology, and a channel bandwidth.

31. The system of claim 28, wherein said second subsystem further comprises instructions for executing, prior to said transmitting the request, a process to determine whether to transmit the request.

32. The system of claim 31, wherein said process is based on predetermined rules.

33. The system of claim 31, wherein said process is based on a location event type.

34. The system of claim 31, wherein said process is based on a dynamic quality of service information analysis.

35. The system of claim 31, wherein said process is based on a quality of the first location.

36. The system of claim 31, wherein said process is based on location error factors.

37. The system of claim 31, wherein said process is based on a past history of location determination using the first and second sensor station groups.

38. The system of claim 31, wherein said process is based on network topology of the first and second sensor station groups.

39. The system of claim 31, wherein said process is based on location determination capabilities of the first and second sensor station groups.

40. The system of claim 28, wherein said second group of sensor stations is selected based on wireless location technology available in each sensor station of said second group.

41. The system of claim 28, further comprising instructions for:
- determining a first probable position of the multi-mode mobile communications device based on analysis of said first radio signal information;
- determining a second probable position of the multi-mode mobile communications device based on analysis of said second radio signal information; and
- determining a combined location estimate as a function of said first and second probable positions.

42. The system of claim 41, wherein said determining the first probable position or said determining the second probable position is performed using time difference of arrival (TDOA) techniques.

43. The system of claim 41, wherein said determining the first probable position or said determining the second probable position is performed using angle of arrival (AOA) techniques.

44. The system of claim 41, wherein said determining the combined location estimate further comprises mathematically combining the first and second probable positions.

45. The system of claim 28, wherein said determining the combined location estimate further comprises selecting a best location estimate as a function of quality metrics.

46. The system of claim 28, further configured to transmit said combined location estimate to a network node in response to a pre-set trigger.

47. The system of claim 28, further configured to transmit said combined location estimate to a network node in response to a prior location request.

48. The system of claim 28, wherein said second radio signal information is received during a call in progress or data session in progress.

49. The system of claim 48, wherein said second radio signal information is received on a traffic channel.

50. The system of claim 28, further comprising at least one subsystem configured to analyze mobile device originated calls for indication of an emergency services call.

51. The system of claim 50, wherein said second radio signal information is received during said emergency services call.

52. The system of claim 41, wherein:
- said first radio signal information is received on a first control channel;
- said second radio signal information is received on a second control channel; and
- said determining the second probable position is performed before a conversation state or data session is initiated for the multi-mode mobile communications device.

53. The system of claim 31, wherein said second subsystem further comprises instructions for receiving an indication of a pending handover, wherein said process is based on said indication.

54. The system of claim 28, wherein said first and second groups comprise at least one common sensor station and the at least one common sensor station is capable of using both first and second radio access technologies.

55. A method for locating a multi-mode mobile communications device in a wireless communications system employing a plurality of radio access technologies, wherein the wireless communications system supports a radio access technology handover mechanism, the method comprising:
- receiving first radio signal information, wherein said first radio signal information is received from the multi-mode mobile communications device at a first group of sensor stations using a first radio access technology;
- transmitting a message indicating a request for a handover of the multi-mode mobile communications device to a second group of sensor stations;
- receiving second radio signal information, wherein said second radio signal information is received from the multi-mode mobile communications device at the second group of sensor stations using a second radio access technology, wherein said first and second groups may comprise common sensor stations; and
- determining a combined location estimate as a function of said first and second radio signal information.

56. The method of claim 55, wherein said first and second radio access technologies differ in at least one of a modulation technique, a radio network topology, and a channel bandwidth.

57. The method of claim 55, wherein said first and second radio access technologies differ in a modulation technique, a radio network topology, and a channel bandwidth.

58. The method of claim 55, further comprising executing, prior to said transmitting the message, a process to determine whether to transmit the message.

59. The method of claim 58, wherein said process is based on predetermined rules.

60. The method of claim 58, wherein said process is based on a location event type.

61. The method of claim 58, wherein said process is based on a dynamic quality of service information analysis.

62. The method of claim 58, wherein said process is based on a quality of the first location.

63. The method of claim 58, wherein said process is based on location error factors.

64. The method of claim 58, wherein said process is based on a past history of location determination using the first and second sensor station groups.

65. The method of claim 58, wherein said process is based on network topology of the first and second sensor station groups.

66. The method of claim 58, wherein said process is based on location determination capabilities of the first and second sensor station groups.

67. The method of claim 55, further comprising:
- determining a first probable position of the multi-mode mobile communications device based on analysis of said first radio signal information;
- determining a second probable position of the multi-mode mobile communications device based on analysis of said second radio signal information; and
- determining a combined location estimate as a function of said first and second probable positions.

68. The method of claim 67, wherein said determining the first probable position or said determining a second probable position is performed using time difference of arrival (TDOA) techniques.

69. The method of claim 67, wherein said determining the first probable position or said determining the second probable position is performed using angle of arrival (AOA) techniques.

70. The method of claim 67, wherein said determining the combined location estimate further comprises mathematically combining the first and second probable positions.

71. The method of claim 55, wherein said determining the combined location estimate further comprises selecting a best location estimate as a function of quality metrics.

72. The method of claim 55, further comprising transmitting said combined location estimate to a network node in response to a pre-set trigger.

73. The method of claim 55, further comprising transmitting said combined location estimate to a network node in response to a prior location request.

74. The method of claim 55, wherein said receiving second radio signal information is performed during a call in progress or data session in progress.

75. The method of claim 74, wherein said second radio signal information is received on a traffic channel.

76. The method of claim 67, wherein:
said first radio signal information is received on a first control channel;
said second radio signal information is received on a second control channel; and
said determining a second probable position is performed before a conversation state or data session is initiated for the mobile communications device.

77. The method of claim 58, further comprising receiving an indication of a pending handover, wherein said process is based on said indication.

78. The method of claim 55, wherein said first and second groups comprise at least one common sensor station and the at least one common sensor station is capable of using both first and second radio access technologies.

79. A system for locating a multi-mode mobile communications device in a wireless communications network employing a plurality of radio access technologies, wherein the wireless communications network supports a radio access technology handover mechanism, the system comprising:
a first group of sensor stations associated with a first radio access technology;
a second group of sensor stations associated with a second radio access technology, wherein said first and second groups may comprise common sensor stations;
a subsystem comprising at least one processor and at least one storage medium communicatively coupled to said at least one processor, the storage medium having stored therein computer-executable instructions for instructing the processor in performing the following steps:
receiving first radio signal information, wherein said first radio signal information is received from the multi-mode mobile communications device at the first group of sensor stations;
transmitting a message indicating a request for a handover of the multi-mode mobile communications device to the second group of sensor stations;
receiving second radio signal information, wherein said second radio signal information is received from the multi-mode mobile communications device at the second group of sensor stations; and
determining a combined location estimate as a function of said first and second radio signal information.

80. The system of claim 79, wherein said first and second radio access technologies differ in at least one of a modulation technique, a radio network topology, and a channel bandwidth.

81. The system of claim 79, wherein said first and second radio access technologies differ in a modulation technique, a radio network topology, and a channel bandwidth.

82. The system of claim 79, further comprising determining, prior to said transmitting the message, that a second probable position is desired.

83. The system of claim 82, wherein said process is based on predetermined rules.

84. The system of claim 82, wherein said process is based on a location event type.

85. The system of claim 82, wherein said process is based on a dynamic quality of service information analysis.

86. The system of claim 82, wherein said process is based on a quality of the first location.

87. The system of claim 82, wherein said process is based on location error factors.

88. The system of claim 82, wherein said process is based on a past history of location determination using the first and second sensor station groups.

89. The system of claim 82, wherein said process is based on network topology of the first and second sensor station groups.

90. The system of claim 82, wherein said process is based on location determination capabilities of the first and second sensor station groups.

91. The system of claim 79, further comprising instructions for:
determining a first probable position of the multi-mode mobile communications device based on analysis of said first radio signal information;
determining a second probable position of the multi-mode mobile communications device based on analysis of said second radio signal information; and
determining a combined location estimate as a function of said first and second probable positions.

92. The system of claim 91, wherein said determining the first probable position or said determining the second probable position is performed using time difference of arrival (TDOA) techniques.

93. The system of claim 91, wherein said determining the first probable position or said determining the second probable position is performed using angle of arrival (AOA) techniques.

94. The system of claim 91, wherein said determining the combined location estimate further comprises mathematically combining the first and second probable positions.

95. The system of claim 79, wherein said determining the combined location estimate further comprises selecting a best location estimate as a function of quality metrics.

96. The system of claim 79, further comprising transmitting said combined location estimate to a network node in response to a pre-set trigger.

97. The system of claim 79, further comprising transmitting said combined location estimate to a network node in response to a prior location request.

98. The system of claim 79, wherein said receiving second radio signal information is performed during a call in progress or data session in progress.

99. The system of claim 98, wherein said second radio signal information is received on a traffic channel.

100. The system of claim 91, wherein:
said first radio signal information is received on a first control channel;
said second radio signal information is received on a second control channel; and
said determining a second probable position is performed before a conversation state or data session is initiated for the mobile communications device.

101. The system of claim 82, further comprising instructions for receiving an indication of a pending handover, wherein said process is based on said indication.

102. The system of claim 79, wherein said first and second groups comprise at least one common sensor station and the at least one common sensor station is capable of using both first and second radio technologies.

103. A system for locating a multi-mode mobile communications device capable of operating in a network providing both Universal Mobile Telecommunications System (UMTS) and Global System for Mobile Communications (GSM) services, wherein the network further implements an Inter-Radio Access Technologies (Inter-RAT) handover/redirection mechanism, comprising:
    a first group of sensor stations configured to receive radio signal information from the multi-mode mobile communications device using UMTS;
    a second group of sensor stations configured to configured to receive radio signal information from the multi-mode mobile communications device using GSM;
    a subsystem comprising at least one processor and at least one storage medium communicatively coupled to said at least one processor, the storage medium having stored therein computer-executable instructions for instructing the processor in performing the following steps:
        receiving first radio signal information from one of the first or second groups of sensor stations;
        transmitting a request for an Inter-RAT handover or redirection;
        receiving second radio signal information from one of the first or second groups of sensor stations; and
        determining a combined location estimate as a function of said first and second radio signal information.

104. The system of claim 103, wherein said second subsystem further comprises instructions for, prior to transmitting the request for the Inter-RAT handover or redirection, executing a process to determine whether to transmit the request.

105. The system of claim 103, further comprising instructions for:
    determining a first probable position of the multi-mode mobile communications device based on analysis of said first radio signal information;
    determining a second probable position of the multi-mode mobile communications device based on analysis of said second radio signal information; and
    determining a combined location estimate as a function of said first and second probable positions.

106. The system of claim 103, wherein said determining the first probable position or said determining the second probable position is performed using one of: time difference of arrival (TDOA) techniques or angle of arrival (AOA) techniques.

107. The system of claim 105, wherein said determining the combined location estimate further comprises mathematically combining the first and second probable positions.

108. The system of claim 103, wherein said determining the combined location estimate further comprises selecting a best location estimate as a function of quality metrics.

109. The system of claim 103, further comprising at least one subsystem configured to analyze mobile device originated calls for indication of an emergency services call, and wherein said second radio signal information is received during said emergency services call.

110. The system of claim 105, wherein:
    said first radio signal information is received on a first control channel;
    said second radio signal information is received on a second control channel; and
    said determining the second probable position is performed before a conversation state or data session is initiated for the multi-mode mobile communications device.

111. The system of claim 103, wherein said second subsystem further comprises instructions for receiving an indication of a pending handover or redirection, wherein said process is based on said indication.

112. The system of claim 103, wherein said first and second groups comprise at least one common sensor station and the at least one common sensor station is capable of using both GSM and UMTS.

113. A method for locating a multi-mode mobile communications device in a wireless communications system employing a plurality of radio access technologies, wherein the wireless communications system supports a radio access technology handover mechanism, the method comprising:
    receiving first radio signal information from the multi-mode mobile communications device at a first group of sensor stations using a first radio access technology;
    determining a first probable position of the multi-mode mobile communications device based on analysis of said first radio signal information;
    causing a handover of the multi-mode mobile communications device to a second group of sensor stations;
    receiving second radio signal information from the multi-mode mobile communications device at the second group of sensor stations using a second radio access technology;
    determining a second probable position of the multi-mode mobile communications device based on analysis of said second radio signal information; and
    determining a combined location estimate as a function of said first and second probable positions.

114. A system for locating a multi-mode mobile communications device, comprising:
    a first group of sensor stations using a first radio access technology and configured to receive first radio signal information from a multi-mode mobile communications device using the first radio access technology;
    a second group of sensor stations using a second radio access technology and configured to receive second radio signal information from the multi-mode mobile communications device using the second radio access technology, wherein said first and second groups may comprise common sensor stations;
    a first subsystem comprising at least one processor and at least one storage medium communicatively coupled to said at least one processor, the storage medium having stored therein computer-executable instructions for instructing the processor to implement a radio access technology handover mechanism;
    a second subsystem comprising at least one processor and at least one storage medium communicatively coupled to said at least one processor, the storage medium having stored therein computer-executable instructions for instructing the processor in performing the following steps:
    receiving said first radio signal information;
    transmitting a request for a radio access technology handover;
    receiving said second radio signal information;
    determining a first probable position of the multi-mode mobile communications device based on analysis of said first radio signal information;
    determining a second probable position of the multi-mode mobile communications device based on analysis of said second radio signal information; and
    determining a combined location estimate as a function of said first and second probable positions.

115. A method for locating a multi-mode mobile communications device in a wireless communications system employing a plurality of radio access technologies, wherein the wireless communications system supports a radio access technology handover mechanism, the method comprising:

receiving first radio signal information, wherein said first radio signal information is received from the multi-mode mobile communications device at a first group of sensor stations using a first radio access technology;

determining a first probable position of the mobile communications device based on analysis of said first radio signal information;

transmitting a message indicating a request for a handover of the multi-mode mobile communications device to a second group of sensor stations;

receiving second radio signal information, wherein said second radio signal information is received from the multi-mode mobile communications device at the second group of sensor stations using a second radio access technology, wherein said first and second groups may comprise common sensor stations;

determining a second probable position of the multi-mode mobile communications device based on analysis of said second radio signal information; and determining a combined location estimate as a function of said first and second probable positions.

116. A system for locating a multi-mode mobile communications device in a wireless communications network employing a plurality of radio access technologies, wherein the wireless communications network supports a radio access technology handover mechanism, the system comprising:

a first group of sensor stations associated with a first radio access technology;

a second group of sensor stations associated with a second radio access technology, wherein said first and second groups may comprise common sensor stations;

a subsystem comprising at least one processor and at least one storage medium communicatively coupled to said at least one processor, the storage medium having stored therein computer-executable instructions for instructing the processor in performing the following steps:

receiving first radio signal information, wherein said first radio signal information is received from the multi-mode mobile communications device at the first group of sensor stations;

determining a first probable position of the mobile communications device based on analysis of said first radio signal information;

transmitting a message indicating a request for a handover of the multi-mode mobile communications device to the second group of sensor stations;

receiving second radio signal information, wherein said second radio signal information is received from the multi-mode mobile communications device at the second group of sensor stations;

determining a second probable position of the multi-mode mobile communications device based on analysis of said second radio signal information; and determining a combined location estimate as a function of said first and second probable positions.

117. A system for locating a multi-mode mobile communications device capable of operating in a network providing both Universal Mobile Telecommunications System (UMTS) and Global System for Mobile Communications (GSM) services, wherein the network further implements an Inter-Radio Access Technologies (Inter-RAT) handover/redirection mechanism, comprising:

a first group of sensor stations configured to receive radio signal information from the multi-mode mobile communications device using UMTS;

a second group of sensor stations configured to configured to receive radio signal information from the multi-mode mobile communications device using GSM;

a subsystem comprising at least one processor and at least one storage medium communicatively coupled to said at least one processor, the storage medium having stored therein computer-executable instructions for instructing the processor in performing the following steps:

receiving first radio signal information from one of the first or second groups of sensor stations;

transmitting a request for an Inter-RAT handover or redirection;

receiving second radio signal information from one of the first or second groups of sensor stations;

determining a first probable position of the multi-mode mobile communications device based on analysis of said first radio signal information;

determining a second probable position of the multi-mode mobile communications device based on analysis of said second radio signal information; and determining a combined location estimate as a function of said first and second probable positions.

* * * * *